United States Patent [19]

Mathieu

[11] Patent Number: 5,489,142
[45] Date of Patent: Feb. 6, 1996

[54] ASTRONOMY CONSOLE

[76] Inventor: Gerald N. Mathieu, R.R. 1, Box 1255, Sabattus, Me. 04280

[21] Appl. No.: 226,823

[22] Filed: Apr. 13, 1994

[51] Int. Cl.⁶ ................................................... A47C 1/00
[52] U.S. Cl. .................. 297/327; 297/330; 297/344.26; 297/344.23; 297/217.7; 297/217.1; 297/217.4; 297/180.1; 359/430
[58] Field of Search .............................. 297/217.1, 217.2, 297/217.3, 217.4, 217.5, 217.6, 217.7, 344.23, 344.21, 344.1, 325, 329, 330, 463.2, 180.12, 180.13, 180.1, 328, 452.18, 452.19, 452.21, 452.29; 33/268, 275 R; 359/429, 430, 382–384

[56] References Cited

U.S. PATENT DOCUMENTS

| | | |
|---|---|---|
| D. 311,472 | 10/1990 | Giles. |
| 1,829,614 | 10/1931 | Schier ............................... 359/429 X |
| 2,669,784 | 2/1954 | Lewis, Jr. .......................... 297/354.1 X |
| 2,708,474 | 5/1955 | Lindroth. |
| 2,807,089 | 9/1957 | Lewis ................................. 297/217.2 X |
| 3,136,577 | 6/1964 | Richard ............................ 297/180.12 X |
| 3,172,699 | 3/1965 | Naughton. |
| 3,670,097 | 6/1972 | Jones. |
| 3,762,767 | 10/1973 | Powell. |
| 4,101,168 | 7/1978 | Ferro ................................. 297/330 X |
| 4,379,588 | 4/1983 | Speice ............................... 297/330 X |
| 4,437,736 | 3/1984 | Janosik, Sr.. |
| 4,465,347 | 8/1984 | Task et al.. |
| 4,672,438 | 6/1987 | Plante et al.. |
| 4,740,779 | 4/1988 | Cleary et al.. |
| 4,925,240 | 5/1990 | Peters ............................... 297/217.3 X |
| 5,015,189 | 5/1991 | Wenzinger, Jr.. |
| 5,089,911 | 2/1992 | Weyrauch et al.. |
| 5,211,172 | 5/1993 | McGuane et al. ................ 297/217.3 X |
| 5,318,340 | 6/1994 | Henry .............................. 297/344.21 X |

FOREIGN PATENT DOCUMENTS

| | | |
|---|---|---|
| 2116396 | 9/1983 | United Kingdom. |
| 2129290 | 5/1984 | United Kingdom. |
| 2206421 | 1/1989 | United Kingdom. |

*Primary Examiner*—Milton Nelson, Jr.
*Attorney, Agent, or Firm*—Richard C. Litman

[57] ABSTRACT

An astronomy console includes various features which provide greater comfort and convenience for a user thereof. The console includes a seat which may include heating and/or cooling systems therein, as well as attachment for a telescope or other optical equipment to be aligned with the eye of the viewer or user. The console includes a horizontal and a vertical axis, which axes are motorized in order to provide for the tracking of celestial objects. The tracking process may be automated, or may be manually controlled by a switch panel or keyboard, as desired. Additional comfort and convenience features may be incorporated, such as audio systems for the enjoyment of the observer, and/or computer driven graphics displays of star charts and the like. The present astronomy console will be seen to be of great value particularly to ardent amateur astronomers who enjoy the hobby, but by its nature would be otherwise required to partake of the hobby in whatever ambient conditions might randomly occur.

9 Claims, 5 Drawing Sheets

ASTRONOMY CONSOLE

FIELD OF THE INVENTION

The present invention relates generally to adjustably positionable special purpose seating, and more specifically to embodiments of a chair structured specifically for astronomy observations. The chair provides comfort for the astronomer, as well as fixed mounting for at least one optical apparatus and automated tracking of astronomical objects, and may also provide additional comforts such as audio programs, computer generated star charts, etc.

BACKGROUND OF THE INVENTION

Traditionally, astronomy has been an activity which provides little consideration for the comfort of the astronomer. Long hours are commonly spent in the outdoors, or at least at ambient temperature and humidity due to the impracticality of enclosing the observing instruments. While professional facilities have for the most part automated and computerized their telescopes and viewing instruments to obviate need for the astronomer to be physically present at the scope during observations, the equipment generally available at the amateur level precludes such remote viewing.

While many, if not most, amateur astronomers enjoy working directly with their equipment, heretofore no one has developed any supplementary apparatus providing for comfort in the field during observations. While various chairs, optical aids, etc. have been developed, all have enclosures, lack of adaptability for use with astronomical instruments, or other flaws which render them unsuitable for the purposes of the present invention.

The need arises for an astronomy console which provides relative comfort for the astronomer using the apparatus. The console should provide comfortable seating, including heating as desired, and should also provide for the fixed attachment of a telescope or other optical equipment thereto, with the optical equipment and seating being automated to enable the scope or other equipment to track the selected astronomical object. Additional features, e. g., audio systems, computer generated star and planetary charts and the like, etc., may also be provided.

DESCRIPTION OF THE PRIOR ART

U.S. Pat. No. 2,708,474 issued to Gerald J. Lindroth on May 17, 1955 discloses a Reclining Seat Construction in which back and bottom portions may extend from a relatively upright to a relatively reclining position. No motorized means is provided for such, nor is the seat assembly arcuately pivotable about any axis, either horizontal or vertical, as in the present invention. No means is provided for the attachment of optical or other equipment thereto, as in the present invention.

U.S. Pat. No. 3,172,699 issued to John L. Naughton on Mar. 9, 1965 discloses a Dental Chair having articulated seat and back portions unlike the relatively fixed back and bottom portions of the chair of the present astronomy console and fixed attachment means for optical and other equipment. Motorized means are provided for the adjustment, but while vertical adjustment is provided to raise and lower the chair, no disclosure is made of rotating the chair about a vertical axis, nor is any attachment means for other equipment disclosed.

U.S. Pat. No. 3,670,097 issued to James L. Jones on Jun. 13, 1972 discloses a Stereoscopic Television System And Apparatus. A stereoscopic eyepiece, as well as helmet attachment means, are disclosed by Jones. While the present invention may make use of stereoscopic viewers for telescopes and optical instruments used therewith, such devices are not a primary part of the present invention, but may be used in combination with optical instruments used with the present invention. The helmet mounting of the apparatus is also unlike the automated and/or motorized chair and console mechanism of the present invention.

U. S. Pat. No. 3,762,767 issued to Alfred J. Powell on Oct. 2, 1973 discloses an Environmental Chair which is substantially enclosed within an outer shell, to isolate a user thereof from the external environment. The chair and its cabinet are rotatable about a vertical axis (but not about a horizontal axis, as in the present console) and provide at least audio input to a person in the chair, as in the present invention. However, the present astronomy console and chair are not intended to isolate a person from the environment, which function would destroy the utility of the present chair as an astronomical viewing aid. Rather, the present invention is intended to provide maximum comfort to a person exposed to the environment.

U.S. Pat. No. 4,437,736 issued to Daniel R. Janosik, Sr. on Mar. 20, 1984 discloses a Sun Viewing Apparatus comprising a substantially enclosed cabinet and a series of lenses and/or prisms providing for the indirect viewing of the sun. The device may be considered along the lines of a reflecting telescope, and no means is provided for automatic alignment with the sun, or for the comfort of a person using the device, as in the present invention.

U.S. Pat. No. 4,465,347 issued to Harry L. Task et al. on Aug. 14, 1984 discloses a Helmet Mounted Telescope which projects an image onto a partially silvered visor in front of the viewer and wearer of the helmet. No motorized or automated control of the scope is provided, as it is fixedly secured to the helmet worn by the viewer. No seating or other means is disclosed to provide for the comfort of the user, as in the present invention.

U.S. Pat. No. 4,672,438 issued to Robert Plante et al. on Jun. 9, 1987 discloses a Tracking Simulator used for training personnel in the operation of a cinetheodolite, used in tracking and filming high speed aircraft, missiles, projectiles, etc. in testing. The cinetheodolite disclosed in the Plante et al. patent provides rotary motion about a vertical axis for the operators, but no arcuate motion about a horizontal axis is provided, as in the present invention. Rather, the tracking telescope arcuately rotates about a horizontal axis independently of the operators. No automated tracking means is provided, nor are any features providing for the comfort of the operators, as in the present invention.

U.S. Pat. No. 4,740,779 issued to Patrick J. Cleary et al. on Apr. 26, 1988 discloses an Aircraft Panoramic Display providing an aircraft cockpit analog display of a synthesized external visual environment for flight crews in instrument conditions. While the screen(s) is/are fixed relative to the seats of the aircraft, the apparatus is incompatible with open cockpit aircraft and does not expose the user to the environment, as in the present invention. The pilots operating the aircraft manually maneuver the aircraft to cause the aircraft to fly the desired path. While manual maneuvering of the present astronomy console is provided, the procedure is automated once the scope is positioned as desired.

U.S. Pat. No. 5,015,189 issued to Wenzinger, Jr. on May 14, 1991 discloses a Training Apparatus for tractor-trailer truck drivers, comprising a small scale traffic and street environmental area and like scaled trucks equipped with cameras. The student driver controls the miniature truck by means of standard controls from a realistic truck cab, and views the scenes from the truck model cameras according to the maneuvering of the model due to the input from the student. While the student driver manually provides input to control remotely the position of the truck model, the driver position remains stationary. No movement of the operator, chair, and visual device (e. g., telescope) is provided by Wenzinger, Jr., nor is such operation automated, as in the present invention.

U.S. Pat. No. 5,089,911 issued to Adolf Weyrauch et al. on Feb. 18, 1992 discloses a Telescope Having Image Field Stabilization. While a binocular eyepiece is disclosed, the device is directed to stabilizing means for an optical device. No motorized positioning or guidance means is disclosed, either automated or otherwise, and no additional features providing for the comfort of the observer are disclosed.

U.S. Pat. No. D-311,472 issued to Michael H. Giles on Oct. 23, 1990 discloses a Combined Pillow, Cassette Player And Speakers. The present invention provides for speakers within the headrest of the chair portion of the apparatus in addition to other features, but the appearance is unlike the Giles design and the audio equipment (other than the speakers) is not located within the headrest portion of the apparatus, as in Giles.

British Patent No. 2,116,396 to Brian E. Mason et al. and published on Sep. 21, 1983 discloses a Portable Studio for the "live" video transmission of animated cartoons, captions and other flat copy. While the device generally comprises a console, the camera position is fixed relative to the object screen, upon which an operator manipulates panels, artwork or the like to produce video images. No means is disclosed to allow the camera to track a relatively moving object, nor is any means disclosed to provide for the comfort of the operator or for the movement of the operator relative to the camera, as the camera is fixed once the setup is complete.

British Patent No. 2,129,290 to James H. Broadhead et al. and published on May 16, 1984 discloses a Patient Support (dental chair) in which the bottom or seat portion and the back portion are relatively movable, unlike the relatively fixed back and seat of the present chair. The seat portion of the Broadhead et al. chair is arcuately pivotable about a horizontal axis, but no means is provided to turn the chair about a vertical axis, as in the present invention, nor is any means provided for the attachment of optical or other equipment thereto or for manual or automated control of the chair by a person in the chair.

Finally, British Patent No. 2,206,421 to Donald R. C. Price et al. and published on Jan. 5, 1989 discloses a Binocular Stereoscopic Head-Up Display System which provides a virtual image at a closer, finite distance than a background image. A keyboard is provided to affect the image, but no means is provided for the actual movement of the optical system or for an operator's seat connected thereto, as in the present invention, nor is any other equipment providing for the comfort of the user disclosed.

In addition to the above, applicant is aware of azimuth telescope mounts for the tracking of celestial objects. Such mounts utilize a single rotary axis parallel to the earth's axis, and the optical instrument rotates about that axis in a direction opposite to the rotation of the earth to maintain constant alignment with the selected celestial object. However, as only a single axis is provided which is at some angle to the horizontal (except at the equator, where the azimuth mount axis is parallel to the earth's surface), any left/right tilt of a device (telescope, chair, etc.) secured to such a mount will only be neutralized when the equipment is aimed at the zenith of the ecliptic. As the equipment is positioned to either side of the zenith, it will tilt to the left or the right, thus causing an observer in a chair fixedly attached to such a mount to be tilted left or right. For example, when the tracking has passed the zenith and is moving to the west, it will lower the equipment at an angle to the horizon, which angle is complementary to the latitude of the observation station. When the equipment is aligned precisely with the horizon, the chair (and/or other equipment secured to such an azimuth mount) will be seen to be tilted to the right (in the northern hemisphere) at a complementary angle to the latitude of the observation point. Thus, such a single axis mount is not suitable for the present invention, in which comfort for the observer is a primary goal. While gimbaled mounts and the like may be provided for the observer, the additional complexity and interface with the optical instrument are beyond the scope of the present invention.

None of the above noted patents, taken either singly or in combination, are seen to disclose the specific arrangement of concepts disclosed by the present invention.

SUMMARY OF THE INVENTION

By the present invention, an improved astronomy console is disclosed, which apparatus includes at least seating means, attachment means for an optical astronomy observation device, and means providing for the tracking of a celestial object with the observation device.

Accordingly, one of the objects of the present invention is to provide an improved astronomy console which seating means provides relative comfort for an astronomical observer seated therein, and which seat may include heating and/or cooling means therein.

Another of the objects of the present invention is to provide an improved astronomy console which provides motorized tracking of celestial objects, either fully automated or by manual control of the drive motors.

Yet another of the objects of the present invention is to provide an improved astronomy console which provides for the tracking of celestial objects by means of two axes of rotation, comprising a horizontal axis and a vertical axis, with the tracking control integrating the drives of the horizontal and vertical axes to provide accurate tracking and enabling the lateral axis of the seating means of the apparatus to remain horizontal for the comfort of the observer.

Still another of the objects of the present invention is to provide an improved astronomy console which may include audio systems for the enjoyment of the user thereof.

A further object of the present invention is to provide an improved astronomy console in which the seating means and mounting for the optical device are moved as a single unit to provide tracking of celestial objects.

A final object of the present invention is to provide an improved astronomy console for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
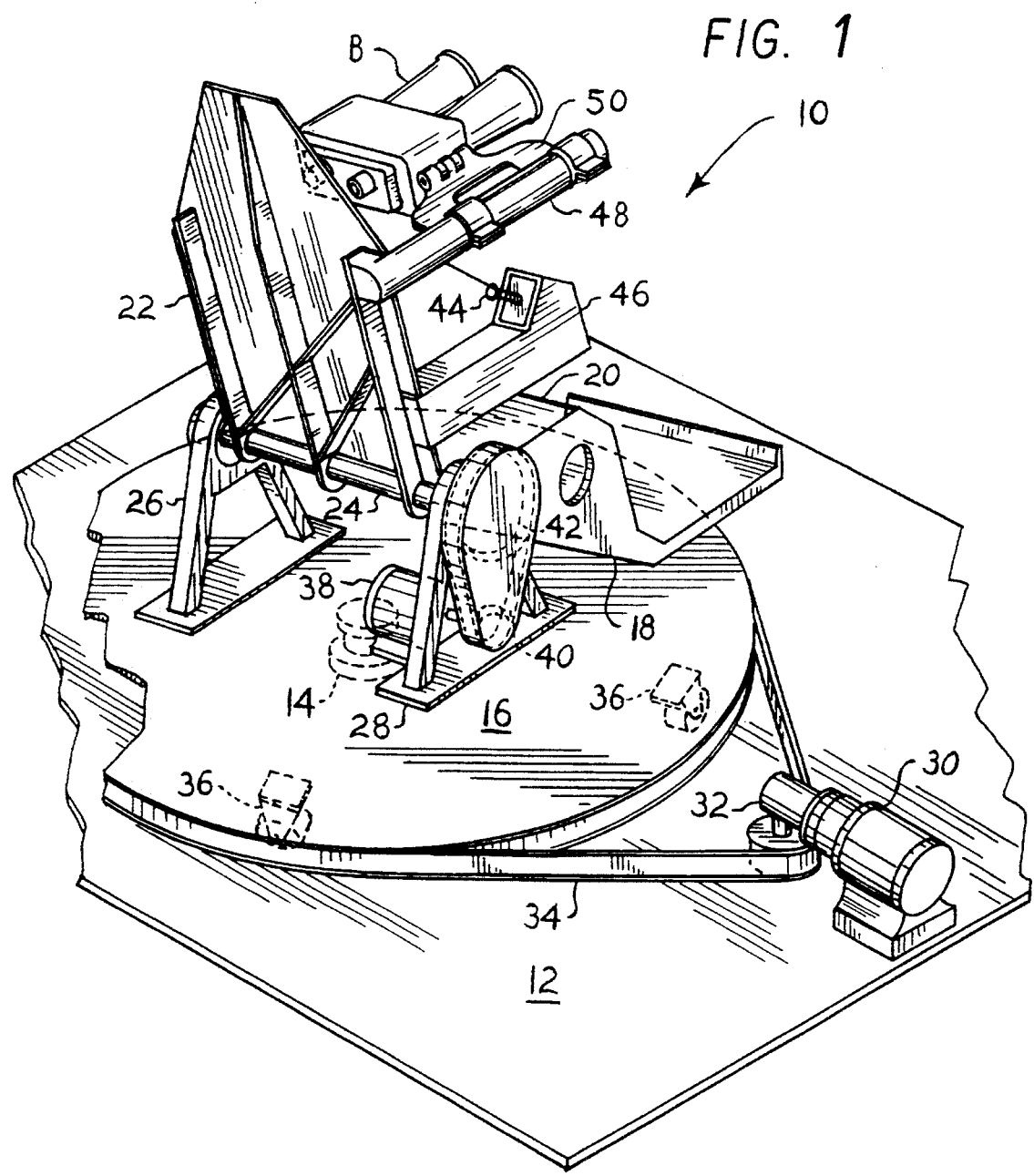
FIG. 1 is a right side and rear perspective view of a first embodiment of the astronomy console of the present invention, showing its general features.

Referring now particularly to FIG. 1 of the drawings, the present invention will be seen to relate to an astronomy console 10 providing for the comfort and convenience of an astronomer using the console 10. Generally, university and professional optical astronomy facilities have become so sophisticated and automated, that an observer need not make direct observations using one of the facility telescopes and exposed to the outside environment, but remains comfortable in an environmentally controlled closed room and remotely views the field of view of the telescope by electronic transmittal means from the scope to the viewing site.

However, amateur astronomers, and many smaller college and university astronomy programs, cannot afford such remote viewing facilities and the observer must be physically at the telescope for all observations. As the telescope (and therefore the observer) is exposed to ambient conditions, such an observer may have great difficulty in remaining comfortable under some circumstances, particularly on clear, cold winter nights when optical astronomy viewing conditions are often optimal. It may be especially difficult to make fine adjustments of the alignment of the telescope, change eyepiece lenses, and/or make notes under such conditions, where the observer's hands and fingers may be numb with cold and/or the observer may be wearing gloves or mittens.

Additionally, most smaller telescopes and viewing devices (other than handheld) require the observer to assume a relatively uncomfortable position in order to see the field of view through the eyepiece, depending upon the type of telescope, the height of the tripod or other mounting, etc. Even if the scope is initially set up in a position for comfortable viewing, as the relative positions of the stars and planets shift due to the rotation of the earth, the telescope must be adjusted (either manually or by automated motorized means) to track the selected celestial object, and accordingly the observer may find the position of the eyepiece to require an uncomfortable viewing position at best.

Figure 2:
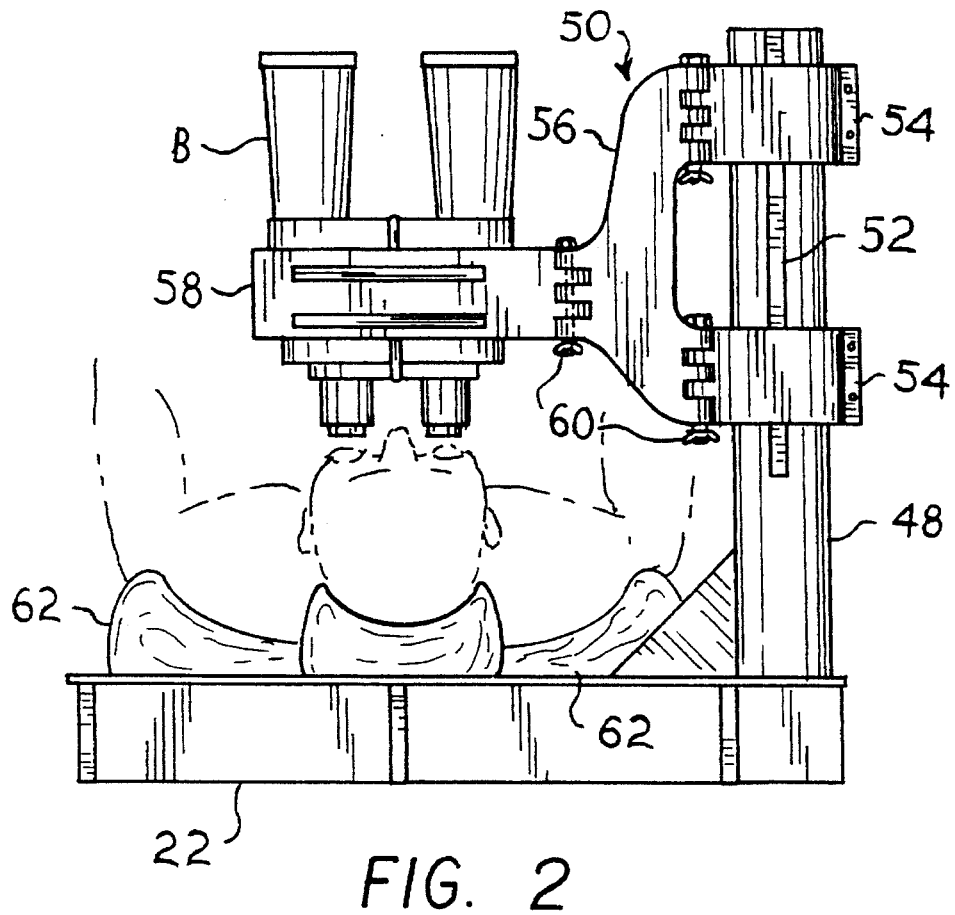
FIG. 2 is a top plan view of the astronomy console of figure 1, showing various structural and optical equipment attachment details.
Figure 4:
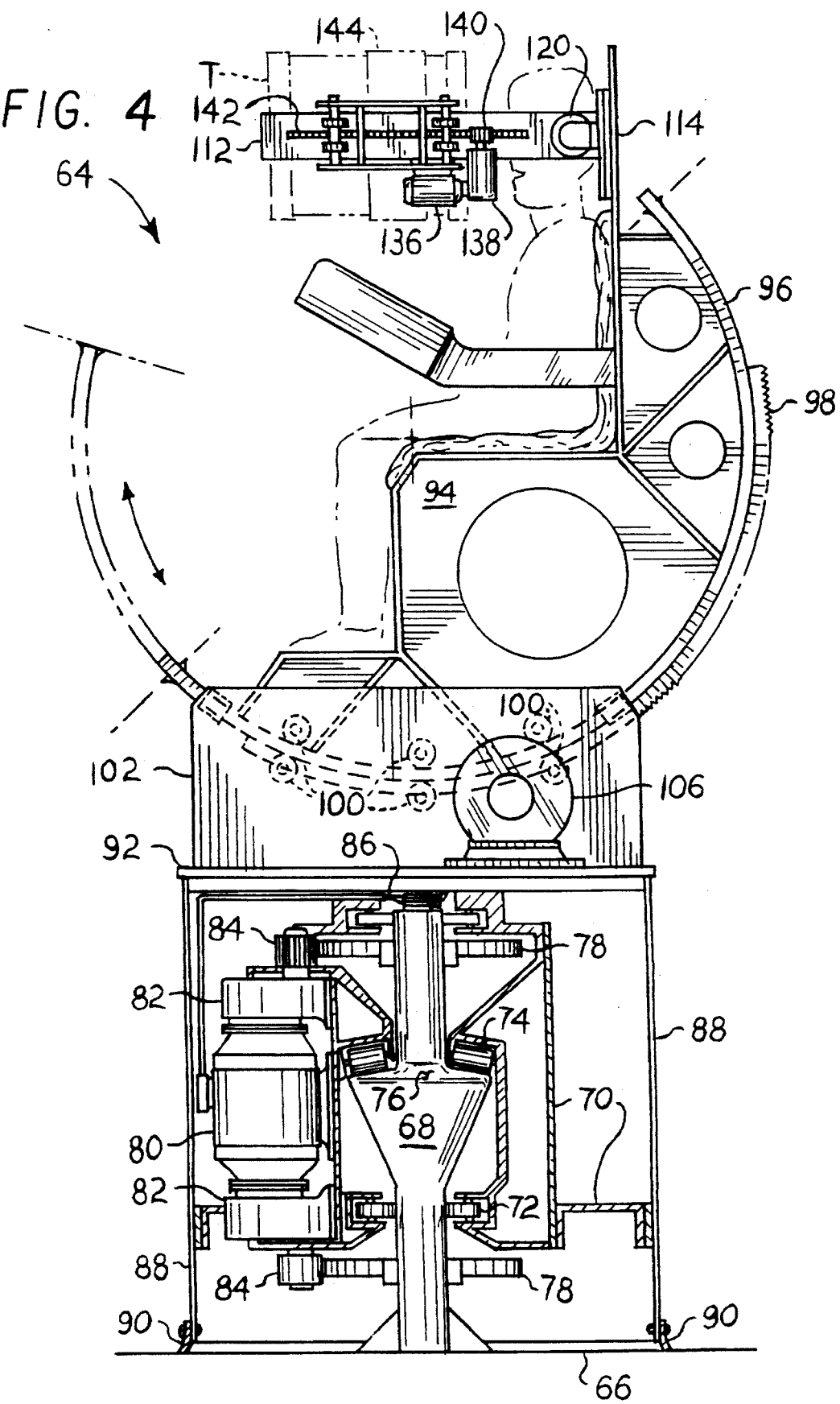
FIG. 4 is a side view in section of a second embodiment of the present invention, showing the azimuth drive mechanism and other details.
Figure 5:
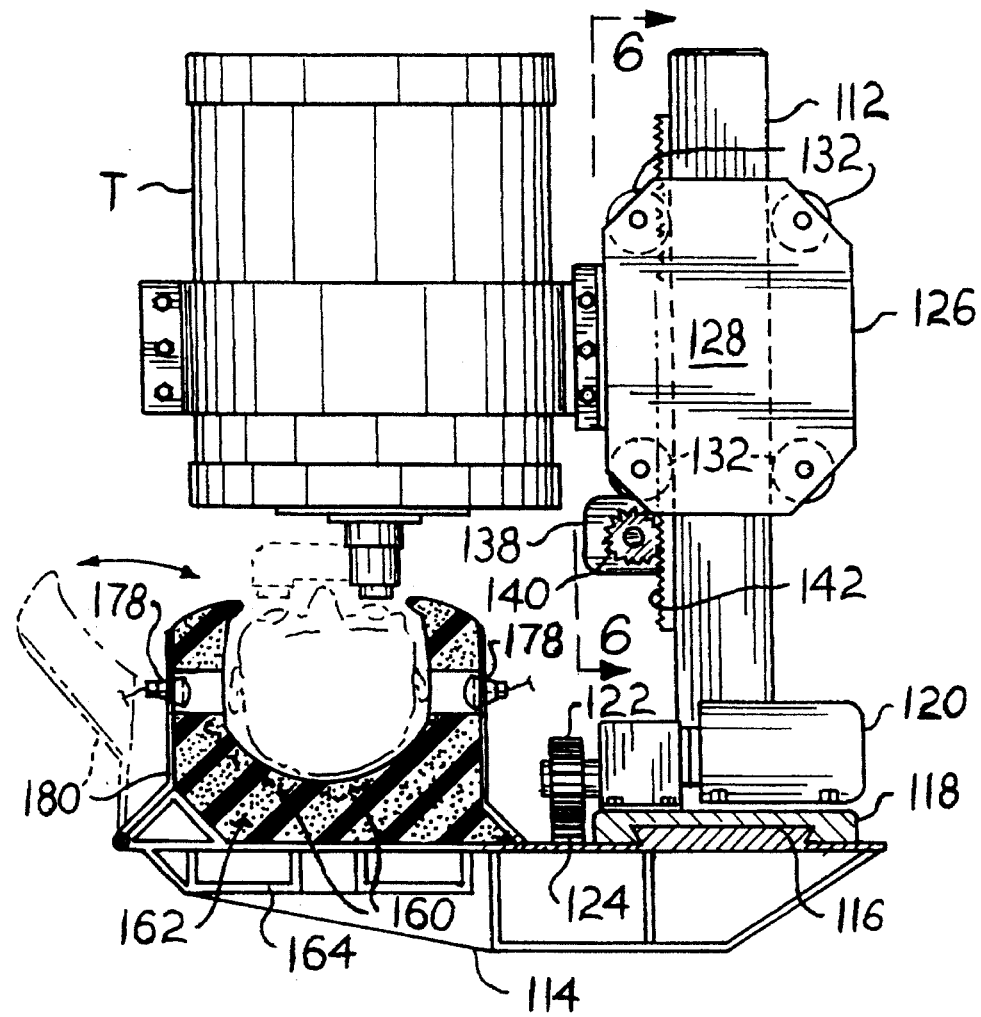
FIG. 5 is a top plan view of the astronomy console of FIG. 3, showing details of the optical equipment attachment, adjustment means, and other details.

The present astronomy console 10 obviates the above problems for the serious amateur astronomer, by integrating a movable chair with a telescope or other optical instrument to fix the instrument relative to the eye(s) of the observer so the observer may remain seated in comfort. The present invention basically comprises a fixed base 12 having a central column 14 extending upwardly therefrom, with a movable platform 16 pivotally installed atop the vertical column 14. A chair 18 having a seat portion 20 and a back portion 22 is pivotally installed above the movable platform 16; the chair 18 is preferably padded or upholstered, as shown in FIGS. 2, 4, and 5. The seat portion 20 and back portion 22 of the chair 18 are joined along a common edge with a horizontal lateral crossmember 24 extending therealong and to either side of the chair 18 and defining a horizontal lateral axis. The lateral crossmember 24 is supported by two chair supports 26 and 28 which extend upwardly from the upper surface of the movable platform 16, to allow the chair 18 to pivot between the supports 26 and 28 about the horizontal lateral crossmember 24.

The vertical axis defined by the central vertical column 14 and the horizontal axis defined by the lateral crossmember 24, provide the required arcuate degrees of freedom in azimuth and elevation for the present astronomy console to track celestial objects. Movement of the chair 18 about these two axes may be motorized in order to provide automated tracking of objects, as shown in FIG. 1. A platform drive motor 30 is affixed to the base 12, and may include a reduction drive such as the right angle drive 32 shown. The motor 30 provides rotational motion to the circular movable platform 16 by means of a drive belt or chain 34 (e.g., roller chain, V-belt, flat belt, toothed belt, etc.), which provides further speed reduction due to the relatively large diameter of the movable platform 16 and relatively small diameter of the reduction drive wheel or sprocket. The movable platform 16 may be further supported by a series of peripheral wheels or rollers 36 installed between the platform 16 and the underlying fixed base 12. Angular elevation of the chair 18 about the horizontal axis is provided by an electric chair drive motor 38, which may drive the chair 18 by means of a reduction drive (similar to that shown in FIG. 3) communicating with a belt or chain 40 to a lateral crossmember pulley or sprocket 42.

It will be seen that coordination of the operation of the two motors 30 and 38 will enable the chair 18, and any optical instrument secured thereto, to track accurately any selected celestial object. The platform drive motor 30 will run at essentially a constant rate to provide constant rotation for the platform 16 (and thus the chair 18 secured thereabove), while the chair drive motor 38 will raise and lower the angle of the chair 18 according to the ascension or elevation angle of the selected celestial object. The resulting path of the field of view of an optical instrument secured to the chair 18 will be seen to be an arc from horizon to horizon, with the span of the arc being determined by sidereal time (approximately 11 hours, 58 minutes from horizon to horizon) and the height being determined by the ascension or elevation of the selected celestial object to be viewed. Programming of the present astronomy console to automatically follow such a path will be seen to be relatively simple and is known in the prior art in other fields, e.g., the generation of circular arcs in mathematics and geometric pursuits; the present astronomy console makes use of such a program or algorithm to drive the motors 30 and 38 to provide alignment of the chair 18 (and any optical instrument secured thereto) with a selected object.

Figure 7:
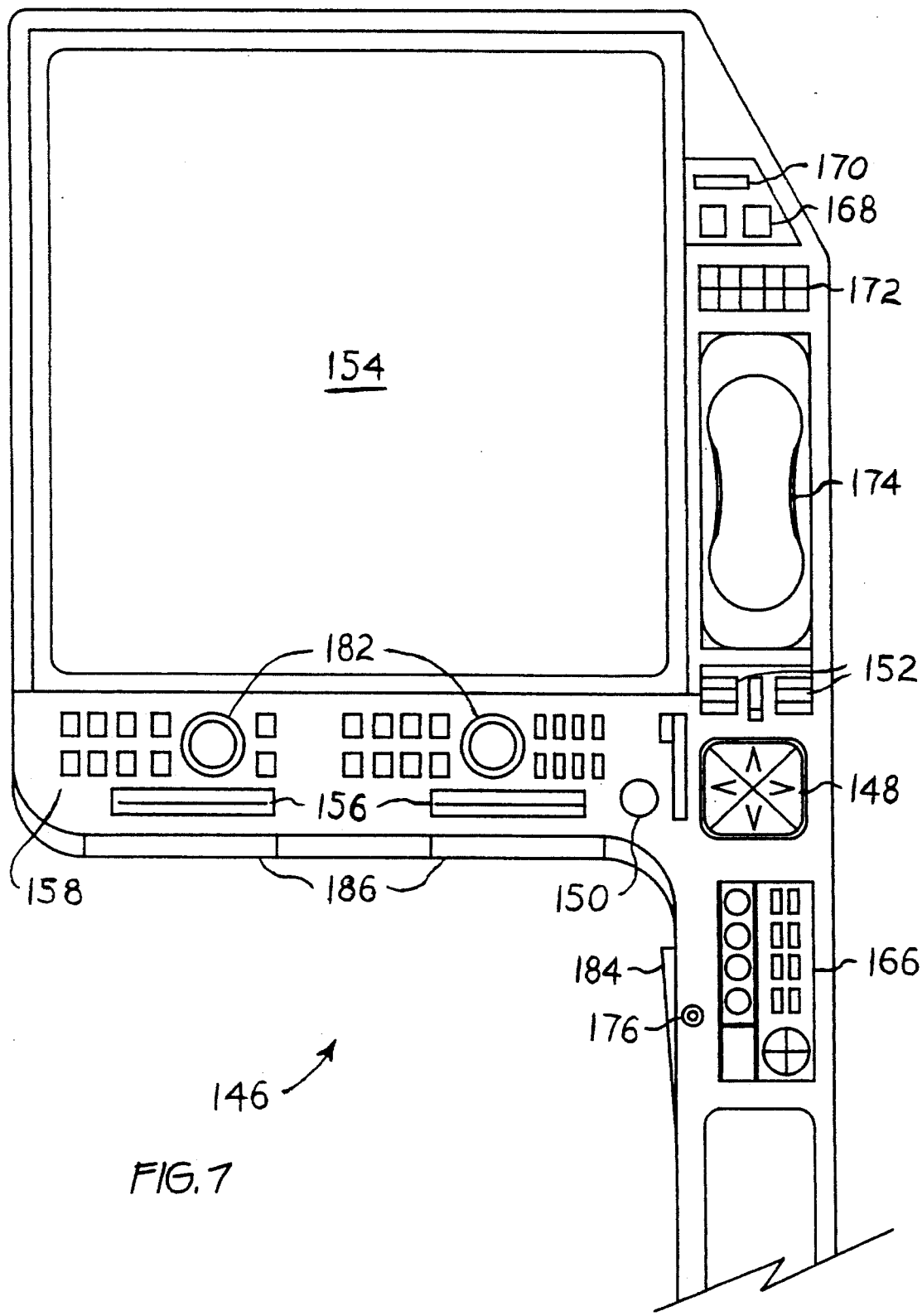
FIG. 7 is a plan view of the control console of the astronomy console of FIG. 3, showing its controls and provisions.

Alternatively, manual control may be provided by a controller such as the joystick 44 shown in FIG. 1, extending from the control center 46 which in turn extends from the back portion 22 of the chair 18. The control center 46 may contain the programming to drive the two motors 30 and 38, and in a more sophisticated embodiment may contain additional features as well, as described further below. Other control means may be used, such as a key pad as shown in FIG. 7 and discussed further below. Conventional left/right and/or up/down inputs provide for the relatively rapid movement (i. e., several times faster than apparent celestial movement) of the azimuth and elevation of the chair 18 to a desired position, at which point the arcuate path described above may be automated to provide continual tracking.

A distinct advantage of the above described two axis tracking system provided by the present invention, is the fact that the chair 18 will always remain level relative to the lateral axis, thus providing further comfort for an observer seated therein. Conventional azimuth telescope mounts are oriented to be parallel to the rotational axis of the earth, and thus are inclined to the horizontal at an angle equal to the latitude of the point at which the telescope is located. This is not a problem for the conventional telescope or other optical device and accessories (e.g., camera, photometer, etc.), but it will be seen that as the scope tracks from east to west, that the lateral axis will be tilted relative to the horizon (except at the earth's poles, where the axis of the azimuth mount is vertical to the surface of the earth). If such a single axis azimuth mount were to be used in combination with the chair of the present invention, the resulting tilt of the lateral axis of the chair would be uncomfortable for an observer seated therein, to say the least. Accordingly, the present two axis system has been developed in order to keep the lateral axis of the chair parallel to the surface of the earth under all viewing circumstances and conditions.

An attachment arm 48 for the attachment of optical devices thereto, extends forwardly from one edge of the back portion 22 of the seat 18. An optical instrument attachment bracket 50 (more clearly shown in FIG. 2) extends laterally inward from the arm 48, and is disposed in front of the upper portion of the back portion 22 of the seat 18 and spaced apart therefrom, providing room for an observer to rest against the seat back while viewing objects through an optical instrument (e.g., binoculars B) secured within the attachment bracket 50. The attachment bracket 50 of the astronomy console 10 is slidably affixed to the arm 48 to provide adjustment of the space between an optical instrument secured therein and the back of the seat 18 for an observer. Axial motion of the bracket 50 about the arm 48 is precluded by means of a longitudinal keyway 52 (FIG. 2) in the arm 48 and cooperating key (not shown) in the bracket 50. The bracket 50 preferably comprises arm clamp portions 54, an intermediate portion 56, and an instrument securing portion 58, which portions 54, 56, and 58 are movably affixed to one another by bolts and wing nuts 60 or other means providing for ease of adjustment. Thus, the arm attachment brackets may be slid along the arm 48 to establish the desired spacing between the instrument B and the chair back 22, and the various components 54, 56, and 58 manually adjusted to establish the proper height of the instrument relative to the line of sight of the observer.

The above described astronomy console 10 will be seen to provide for the basic requirements of the serious astronomy hobbyist or student. While the bracket 50 is shown with a pair of binoculars B secured therein, it will be seen that the optical instrument clamp portion 58 of the bracket 50 may be adapted to hold or secure various different types of optical instruments, including such relatively sophisticated instruments as the telescope T of FIGS. 4 and 5. Different instrument clamps may be easily installed to the intermediate portion 56 of the bracket 50, merely by removing the fastener 60 securing the instrument clamp and intermediate portions together and replacing the instrument clamp as desired. Other conveniences for the observer are preferably provided also, e.g., upholstery or padding 62 for the chair 18 (the back 22 of which is shown in FIG. 2).

FIG. 4 provides a side view in section of a second embodiment 64 of the astronomy console of the present invention, which embodiment provides additional automation and further comfort and convenience features, as described below. The automated astronomy console 64 of FIG. 4 includes a fixed base 66, from which a fixed central column 68 extends upwardly. A movable, rotatable frame 70 is disposed about the column 68 by upper and lower rollers 72 and 74, with the upper rollers riding on a conical surface 76 of the column 68 to provide support for the frame 70 and other structure thereabove. At least one (and preferably an upper and a lower) fixed gear 78 is provided, concentrically affixed to the column 68, while an electric platform drive motor 80 is affixed to the rotating frame 70. The drive motor 80 includes a reduction drive unit 82 for each of the fixed concentric gears 78, with the motor 80 driving a pinion gear 84 which meshes with each of the concentric fixed gears 78 to provide rotary motion. Power may be provided to the motor 80 (which rotates with the frame 70) by means of an electrical conduit (not shown) which passes through the fixed central column 68 and thence to the motor 80 by means of brushes 86 or the like. Power may be provided to the upper portion of the automated console 64 in a like manner. A shroud 88 is secured to the rotating frame 70, to preclude entry of debris, vermin, etc. into the mechanism; a skirt 90 may be provided at the base of the shroud, which skirt 90 bears against the fixed base 66.

A movable platform 92 is affixed to and supported by the rotating frame 70, which platform 92 in turn supports an observer's chair 94 and other equipment and structure. The chair 94 includes a supporting structure having a semicircular periphery for a semicircular support track 96 and a toothed drive track 98 disposed along the center of the support track 96. The center of the semicircular periphery defines a lateral axis through the chair 94 and its semicircular support structure and tracks, about which the chair assembly rotates as described below.

Figure 3:
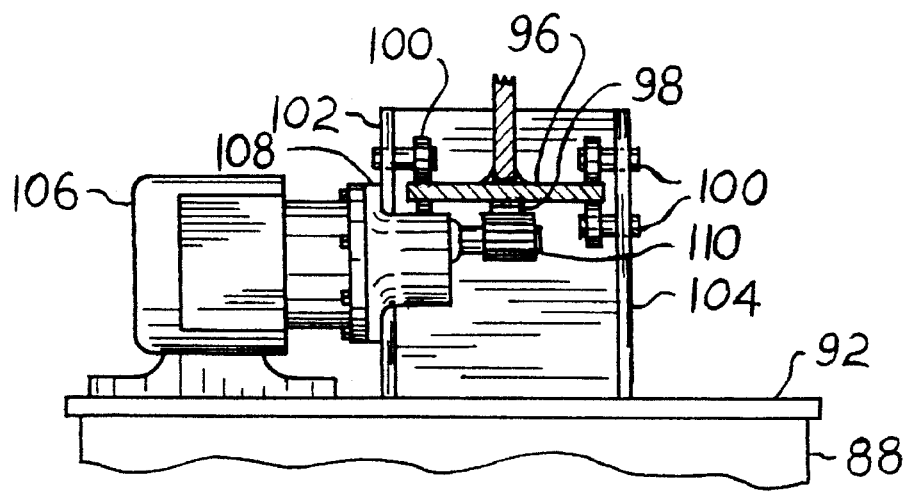
FIG. 3 is a detail view of the elevation drive motor of a second embodiment of the present astronomy console, which second embodiment is shown FIG. 4.

The semicircular support track 96 is sandwiched between a plurality of track retention rollers 100, which in turn extend inwardly from first and second chair assembly support flanges 102 and 104, more clearly shown in the detail of FIG. 3. A chair assembly drive motor 106 is affixed to the movable platform 92, and includes a reduction drive 108 and pinion gear 110, which pinion 110 meshes with the semicircular toothed drive track 98 to provide rotary motion for the chair 94 and attached assembly or structure. The above described operation of the automated astronomy console 64 of FIGS. 3 and 4 will be seen to be similar to the operation of the astronomy console 10 of FIGS. 1 and 2, in that two separate rotational axes (horizontal and vertical) are provided, in order to keep the observer's chair 94 (or 18) level at all times.

Figure 6:
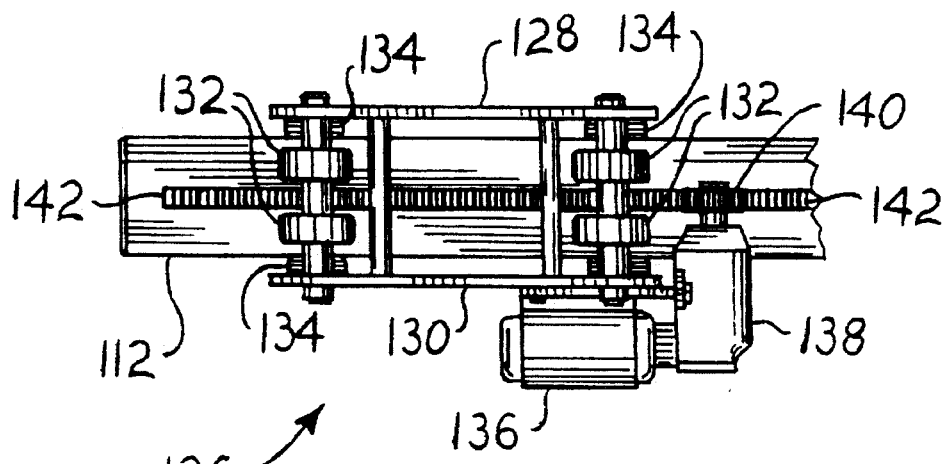
FIG. 6 is a side view in section through line 6—6 of FIG. 5, showing details of the adjustment drive mechanism for the optical equipment.

In a manner similar to that of the astronomy console 10 of FIGS. 1 and 2, the automated console 64 of FIGS. 3 and 4 includes an optical instrument attachment arm 112, the details of which are more clearly shown in FIGS. 5 and 6. However, rather than being immovably affixed to the back portion 114 of the chair 94, a track 116 is provided adjacent one edge of the back portion 114, with a dovetailed fitting 118 slidably cooperating with the track 116. The dovetailed fitting 118 is in turn secured to the attachment end of the arm 112, allowing the arm 112 to translate upward and downward along the track 116. The arm 112 is motorized, with an electric arm drive motor 120 secured to the arm 112 and driving a pinion gear 122. The pinion gear 122 in turn meshes with a toothed rack 124 on the chair back 114, adjacent to the arm track 116. Operation of the arm drive motor 120 thus causes the arm 112 to slidably translate upward or downward along the track 116, depending upon the direction of rotation of the motor 120 as controlled by the operator.

In a like manner, a movable optical instrument attachment bracket 126 is slidably secured to the arm 112; a detail of the arrangement is shown in FIG. 6. Opposite first and second bracket plates 128 and 130 are provided, which plates 128 and 130 sandwich the arm (which is of square or rectangular section) therebetween. A plurality of arm rollers 132 are provided to guide the movable instrument attachment bracket 126 along the arm 112, with additional low friction spacers 134 are provided between each of the first and second bracket plates 128 and 130, and the arm 112. An electric bracket drive motor 136 is affixed to one bracket plate, which motor drives a reduction unit 138 and a pinion gear 140 extending therefrom. The arm 112 is equipped with a longitudinal rack 142, which meshes with the pinion gear 140 to provide fore and aft adjustment of the position of the bracket 126 (and any optical instrument, such as the telescope T) which is secured thereto, according to the operator's control. A clamp(s) 144, as shown in FIGS. 4 and 5, may be used to secure the telescope T or other instrument to the bracket 126.

The motorized bracket 126 described above is suitable for the support of relatively long focal length telescopes T having a comparatively short overall length, such as the cassegrain reflector shown generally in FIGS. 4 and 5. With appropriate modification of the bracket 126, other types of telescopes or optical instruments may be used with the present invention.

The above described automated astronomy console 64 provides a multitude of automated functions and conveniences, which may be controlled by a control center 146 as shown in FIG. 7. As an example of the controls provided by the control center 146, a control pad 148 providing left/right and up/down functions may be used to position the instrument attachment bracket 126 and instrument secured thereto, in the manner of the joystick 44 of the astronomy console 10 of FIGS. 1 and 2 used to position the chair 18 of the console 10. Initial positioning to track a selected celestial object may be provided by the position switch 150 to the left of the control pad 148, whereby the chair may be positioned as desired and then transferred to automated tracking using control switches 152, in the manner described above for the console 10 of FIGS. 1 and 2.

Further information may be provided by the monitor display screen 154, which (when the proper programming is provided) may display azimuth and ascension of the chair and optical instrument secured thereto; graphic display of star charts and/or arcuate positions therefor; positions of the moon, asteroids, planets, and known comets, and a Messier catalog list of galaxies; and may also serve as a notepad for notes by the observer, as well as other functions (time, temperature, pressure, humidity, etc.). Disc drives 156 for floppy and/or 3.25 inch discs, as well as a keyboard 158 of conventional or other configuration, are provided for entering the above functions and programs into the computer.

The above chair 94 may be provided with heating elements, and/or cooled as desired with proper ancillary equipment. For example, the chair 94 may be equipped with electrical resistance heating elements 160 imbedded in the upholstery 162, or alternatively other means may be used to warm the observer seated therein. Ductwork 164 may be provided for cooling airflow, if desired (external insulation thereover has been deleted for clarity). Controls therefor are provided by a control panel 166 in the control center 146.

Additional convenience features may be provided with audio devices, e.g., an am/fm radio 168; cassette tape deck 170; compact disc player 172; and communications system (e.g., cordless or cellular telephone 174, which communications system may also include shortwave and/or citizens band transceivers). The above audio devices may be listened to by means of an audio output jack 176, which provides a signal to headphones or speakers 178 within the headrest of the chair, as shown in FIG. 5 of the drawings. The headrest portion of the chair of FIG. 5 may have a hingedly openable portion 180, to provide for use of the handset of the communications system of FIG. 7. Other instrumentation, e.g. light meter(s) and/or temperature indicator(s) 182 may be provided, as well as other features as desired. Storage space for paper and/or other flat, planar articles may be provided by the storage compartment 184, and fold down storage compartments 186 beneath the keyboard 158 may provide storage for tapes, computer discs, lenses and lens cleaning supplies, etc., as desired.

The above embodiments 10 and 64 of an astronomy console will be seen to provide relatively great utility, comfort and convenience to the serious amateur astronomer or small college or university astronomy program. While the console 10 of FIGS. 1 and 2 are relatively basic, the automated nature of the two axis control system nevertheless provides great comfort for an observer by maintaining the chair therein in a level position, while still enabling the telescope or other optical instrument to track precisely the selected celestial object. The fully automated astronomy console 64 of FIGS. 3 through 7 also provides the same basic functions as the console 10 of FIGS. 1 and 2, but also adds considerably more automated comfort and convenience features. In either case, the above described consoles provide a great advance in comfort and convenience for an astronomer.

It is to be understood that the present invention is not limited to the sole embodiments described above, but encompasses any and all embodiments within the scope of the following claims.

I claim:

1. An astronomy console providing for the comfort and convenience of a user thereof, comprising:

a fixed base portion having a central column comprising a vertical axis extending upward therefrom, with a movable platform rotatably attached to said fixed base portion;

a chair movably attached to said movable platform, with said chair having a horizontal lateral axis and being rotatable about said horizontal lateral axis;

said chair including an optical device attachment arm secured thereto, with said optical device attachment arm being disposed to affix an optical device attached thereto in front of at least one eye of the user of said astronomy console, whereby;

the user of said astronomy console when positioned in said chair causes, by activating a platform drive motor, said movable platform and said chair, including said optical device attachment arm secured to said chair, to rotate about said vertical axis; and by activating a chair drive motor, said chair, including said optical device attachment arm, are rotated about said horizontal lateral axis of said chair; rotation about said axes aligning the optical device attached to said optical device attachment arm with a celestial object, thereby allowing the user of said astronomy console to view the celestial object by means of the optical device;

said movable platform and said chair being motorized;

said central column of said fixed base extending upwardly from said fixed base, with said column having at least one fixed concentric gear disposed therearound and a rotatable frame disposed about said central column;

said rotatable frame having said platform drive motor installed thereon, with said platform drive motor having a drive with at least one pinion gear extending therefrom, and said at least one pinion gear meshing with said at least one fixed concentric gear to provide rotation for said rotatable frame and said platform drive motor;

said rotatable frame having said movable platform affixed thereabove, whereby;

actuation of said platform drive motor of said rotatable frame causes said rotatable frame to rotate by means of said at least one pinion gear of said platform drive motor drive meshing with said at least one fixed concentric gear of said fixed column, thereby providing for rotation of said movable platform affixed above said rotatable frame.

2. The astronomy console of claim 1 wherein:

said chair includes a control center affixed thereto and providing at least means for the manual control of movement of said chair relative to said movable platform and said fixed base.

3. The astronomy console of claim 2 wherein:

said control center includes means providing for the automated control of said chair to cause said chair and said optical device secured thereto to track a celestial object automatically.

4. The astronomy console of claim 2 wherein:

said chair includes speaker means affixed to a back portion thereof, and said control center includes at least one audio device and controls therefor chosen from the group consisting of am radio, fm radio, citizens band radio, short wave radio, cordless telephone, audio tape, and compact disc, with said at least one audio device providing audio output to said speaker means and said audio output being controllable by said controls therefor by the user of said astronomy console.

5. The astronomy console of claim 2 wherein:

said chair includes heating means therein, and said control center includes control means for said heating means.

6. The astronomy console of claim 2 wherein:

said control center includes a personal computer, monitor, and keyboard, whereby parameters for the positioning and control of said chair may be entered, celestial charts and coordinates may be viewed, and viewing notes may be entered.

7. The astronomy console of claim 2 wherein: said chair is upholstered.

8. An astronomy console providing for the comfort and convenience of a user thereof, comprising:

a fixed base portion having a central column comprising a vertical axis extending upward therefrom, with a movable platform rotatably attached to said fixed base portion;

a chair movably attached to said movable platform, with said chair having a horizontal lateral axis and being rotatable about said horizontal lateral axis;

said chair including an optical device attachment arm secured thereto, with said optical device attachment arm being disposed to affix an optical device attached thereto in front of at least one eye of the user of said astronomy console, whereby;

the user of said astronomy console, when positioned in said chair causes, by activating a platform drive motor, said movable platform and said chair, including said optical device attachment arm secured to said chair, to rotate about said vertical axis and to align the optical device attached to said optical device attachment arm with a celestial object, thereby allowing the user of said astronomy console to view the celestial object by means of the optical device, said chair including a semicircular frame therearound, with said semicircular frame having a centroid defining said horizontal lateral axis of said chair, said semicircular frame including a support track extending therearound with a toothed drive track centrally disposed along said support track;

said movable platform including a chair drive motor affixed thereto, with said chair drive motor including a drive with a pinion gear extending therefrom, said pinion gear meshing with said drive track of said chair;

said movable platform further including laterally spaced apart first and second chair supports extending upwardly therefrom, with said chair supports each including a plurality of rollers cooperating with said support track, whereby;

actuation of said chair drive motor causes said chair to rotate about said centroid of said semicircular frame.

9. An astronomy console providing for the comfort and convenience of a user thereof, comprising:

a fixed base portion having a central column comprising a vertical axis extending upward therefrom, with a movable platform rotatably attached to said fixed base portion;

a chair movably attached to said movable platform, with said chair having a horizontal lateral axis and being rotatable about said horizontal lateral axis;

said chair including an optical device attachment arm secured thereto, with said optical device attachment arm being disposed to affix an optical device attached thereto in front of at least one eye of the user of said astronomy console, said optical device attachment arm including an electric arm drive motor having a pinion gear extending therefrom, with said pinion gear meshing with a toothed rack of a back portion of said chair;

said optical device attachment arm further including a toothed rack extending therealong and an optical device attachment bracket slidably affixed to said attachment arm, with said bracket including an electric bracket drive motor having a reduction drive with a pinion gear extending therefrom with said pinion gear meshing with said toothed rack of said arm, whereby;

motorized adjustment of said optical device attachment arm and said optical device attachment bracket is provided respectively by means of said electric arm drive motor and said electric bracket drive motor to cause said arm to translate relative to said back portion of said chair and said attachment bracket to translate relative to said arm, and whereby the user of said astronomy console, when positioned in said chair causes, by activating a motor, said movable platform and said chair, including said optical device attachment arm secured to said chair, to rotate about said vertical axis; and by activating a second motor, said chair, including said optical device attachment arm, are rotated about said horizontal lateral axis of said chair; rotation about said axes aligning the optical device attached to said optical device attachment arm with a celestial object, thereby allowing the user of said astronomy console to view the celestial object by means of the optical device, said chair including a back portion having opposite first and second lateral edges, and said optical device attachment arm is movably affixed to one of said lateral edges of said back portion of said chair and extends forwardly from said back portion of said chair, said back portion of said chair including a track secured adjacent said one of said lateral edges, and said optical device attachment arm is slidably secured to said track of said back portion of said chair;

said toothed rack of said back portion of said chair is parallel and adjacent to said track;

said optical device attachment bracket adjustably extending from the arm and disposed to the front of said back portion of said chair and spaced apart therefrom, whereby;

the user of said astronomy console, when seated in said chair is positioned to make observations by means of the optical device secured to said chair by means of said optical device attachment bracket and said optical device attachment arm.

\* \* \* \* \*